United States Patent
Russell

(10) Patent No.: US 11,277,491 B1
(45) Date of Patent: Mar. 15, 2022

(54) SYSTEM AND METHOD FOR MANAGING DATA, APPLICATIONS AND INTERNET CONNECTIONS FOR MULTIPLE USERS IN A SHARED COMPUTING ENVIRONMENT LOCATED IN PROXIMITY TO THE USER

(71) Applicant: inBuilding Services Corporation, La Jolla, CA (US)

(72) Inventor: Joe E. Russell, La Jolla, CA (US)

(73) Assignee: INBUILDING SERVICES CORPORATION, La Jolla, CA (US)

( * ) Notice: Subject to any disclaimer, the term of this patent is extended or adjusted under 35 U.S.C. 154(b) by 0 days.

(21) Appl. No.: 16/457,475

(22) Filed: Jun. 28, 2019

Related U.S. Application Data

(60) Provisional application No. 62/691,550, filed on Jun. 28, 2018.

(51) Int. Cl.
| | |
|---|---|
| *H04L 29/02* | (2006.01) |
| *H04L 67/60* | (2022.01) |
| *H04L 67/10* | (2022.01) |
| *H04L 47/70* | (2022.01) |
| *H04L 12/28* | (2006.01) |
| *H04L 67/52* | (2022.01) |

(52) U.S. Cl.
CPC .............. *H04L 67/32* (2013.01); *H04L 12/28* (2013.01); *H04L 47/82* (2013.01); *H04L 67/10* (2013.01); *H04L 67/18* (2013.01)

(58) Field of Classification Search
CPC .......... H04L 67/32; H04L 12/28; H04L 67/10
See application file for complete search history.

(56) References Cited

U.S. PATENT DOCUMENTS

| | | | |
|---|---|---|---|
| 2016/0028605 A1* | 1/2016 | Gil | H04W 4/38 |
| | | | 709/213 |
| 2017/0207926 A1* | 7/2017 | Gil | H04W 4/70 |

* cited by examiner

*Primary Examiner* — Adnan M Mirza
(74) *Attorney, Agent, or Firm* — William A. English; Vista IP Law Group LLP

(57) ABSTRACT

A distributed, networked computing system providing a shared computing environment in proximity to tenants in a building plus tenants in other buildings in proximity to such building who connect via an Internet connection optimized to reduce latency, bandwidth requirements and improve data security to a shared computing environment. A building network device receives data processing requests of tenant network devices associated with tenant computing devices in building. Processing requests are aggregated by end user network devices, and building-level multi-user network device aggregates respective data processing requests from respective tenant network devices. Local shared computing system in proximity to building and in communication with multi-user network device receives data processing requests from multi-user network device, determines how execution of data processing requests should be allocated, and transmits results of executing respective data processing requests to multi-user network device, which transmits results to tenant network devices for presentation to tenants.

20 Claims, 12 Drawing Sheets

SYSTEM AND METHOD FOR MANAGING DATA, APPLICATIONS AND INTERNET CONNECTIONS FOR MULTIPLE USERS IN A SHARED COMPUTING ENVIRONMENT LOCATED IN PROXIMITY TO THE USER

CROSS-REFERENCE TO RELATED APPLICATION

This application claims priority under 35 U.S.C. § 119 of U.S. Provisional Application No. 62/691,550, filed Jun. 28, 2018, and entitled SYSTEM AND METHOD FOR MANAGING DATA, APPLICATIONS AND INTERNET CONNECTIONS FOR MULTIPLE USERS IN A SHARED COMPUTING ENVIRONMENT LOCATED IN PROXIMITY TO THE USER, the contents of which are incorporated herein by reference as though set forth in full.

TECHNICAL FIELD

The technical field relates to computer networks, and more particularly, to distributed and shared computing environments.

BACKGROUND

Enterprises are turning to storing and accessing data and programs in a centralized shared computing environment, which has a collection of servers and other network devices connected to the Internet, commonly referred to as the "cloud," instead of the end user's computer's hard drive or servers located in the end user's premises. Cloud computing offers opportunities to reach new markets, foster innovation, and dramatically lower information technology ("IT") costs. However, organizations face challenges when they embrace the cloud.

For example, two different office buildings include respective different and unrelated enterprises or tenants. Examples of office building tenants include an accountant office, an attorney office, a real estate office, etc. Office buildings can have hundreds of individual offices with tenants that are unrelated to each other for various reasons including their different businesses, personnel, computing systems, Internet providers, and computing system needs and capabilities such as different applications, resources, processing and storage needs. For example, an attorney in one an office of one building would not share confidential data about its clients with a doctor's office, and similarly, a doctor in one office of a building would not share confidential patient information with the attorney's office. As another example, an attorney would not require software or computing systems for taking or analyzing x-rays or other medical imaging analyses. Thus, various tenants in an office building have very different computing needs and objectives, and in this regard, are unrelated to each other, whether they are in the same or different office buildings. Various tenants may thus employ cloud-based computing systems for various purposes and applications, such as data storage, data processing and using applications hosted or accessible via the cloud.

Each individual tenant that utilizes the cloud accesses the cloud using their own computing device and their own network connection. For each network connection, data may be communicated by traversing multiple nodes or stops across the network to eventually connect to the cloud. Similarly, results of processing data in the cloud must traverse back across multiple nodes to eventually reach tenant computing devices.

Slower bandwidth Internet connections, however, can cause slow or slower than desired network communications, and these systems may also have issues with latency (delay that occurs during communication over network, which is compounded with slower bandwidth connections) and jitter (deviation or displacement of data packets as they are communicated through network, e.g., certain data packets may take longer to be transmitted than other data packets). Network congestion and routing changes may cause further complications, and network congestion is expected to become even more of an issue with the extension of Internet connectivity into physical devices or objects, also referred to as the Internet of Things (IoT). For example, it is estimated that about 50 billion IoT devices will be coming online with the implementation of 5G technology.

Additional network centric and computer centric issues concern a user's need for the same level of control, security, and governance found in their on-premises and private cloud IT networks to confidently transition to a public cloud environment. However, access and enjoyment of cloud based solutions may not only suffer from bandwidth, latency and jitter as discussed above, but cloud based solutions may also present security concerns. Cloud-based processing using a secure, broadband connection is often difficult to obtain due to high costs, particularly for small and medium sized businesses. While high-speed Internet prices may be declining, many companies are unable to take advantage of savings for numerous reasons. Further, multiple nodes or stops in connecting to the cloud presents security concerns due to the increased risk of data breach. Moreover, users are not certain of the geographic location of their data, which may be important for regulatory compliance.

Further, in the context of tenants in the same building or in proximity to each other (e.g., different, unrelated companies or business in the same office building or in different buildings in geographic or data transmission proximity to each other or in the same neighborhood), it is technologically and operationally impractical for any one tenant to aggregate data processing tasks of other, unrelated and unaffiliated tenants for selection, integration, configuration, and implementation of multiple applications and solutions in the cloud. Further, it is technologically and operationally impractical for a single vendor of technology solutions to aggregate other competing or unrelated applications for selection, integration, configuration and implementation in the cloud.

SUMMARY

Embodiments address network centric and computer centric problems and challenges associated with known public cloud computing systems.

Embodiments provide new distributed computing systems and methods that include or involve multiple distributed computing resources that can be shared among different users of a network on a local shard computing system, e.g., as a Metropolitan Shared Computing Environment (MSCE). Embodiments provide for new distributed networked computing systems and methods and processing between end user computing devices and a local shared computing system located in proximity to the end user, e.g., as a MSCE, with such proximity being based on geographic proximity to the building or group of building, a number of Internet hops from the end user to the MSCE (e.g., reducing or minimizing hop numbers to optimize building to MSCE communications), or a combination thereof.

Embodiments also provide for new distributed computing systems and methods that utilize aggregation of processing requests for end users who are unrelated to each other but within the same building or buildings in proximity to each other in terms of geographic/building and/or data transmission proximity.

Embodiments also provide for providing more efficient execution of data processing requests for tenants in the same building or buildings located in proximity to each other.

Embodiments also addressing how to share distributed resources, particularly for different, unrelated tenants in the same building or in different buildings in proximity to each other to improve network/Internet communications, availability of applications, and making on-demand adjustments of resources to enable management of different types of distributed applications across multiple users and entities while localizing processing relative to a user.

Embodiments provide a new networked computing environment. Embodiments provide new networked computing systems and methods for processing requests of end user computing devices of multiple tenants in a single building, such as multiple, unrelated tenants in the same office building. Embodiments also provide new networked computing systems and methods for processing requests of end user computing devices of multiple tenants in different buildings in proximity to each other, e.g., geographically in proximity to each other such as in the same campus, block or neighborhood.

Embodiments also provide new networked computing systems and methods for processing requests of end user computing devices of unrelated users or tenants in the same building or in buildings located in proximity to each other and processing such requests together in a distributed, networked computing system.

Embodiments also provide for applying edge computing to a multi-tenant building, such as an office building, to address limitations of cloud processing while doing so with improved efficiency and security and reducing bandwidth consumption and latency. Embodiments also relate to end user computing devices of a multi-tenant building sharing a shared computing system that is local relative to the end users in a building and in other buildings in proximate relation to a building (such as a campus of buildings) and is a private system for the building or group of related buildings in proximity to each other.

Embodiments provide for enabling multiple users to share multiple resources in a shared computing environment located in proximity to the users. More particularly, disclosed embodiments relate to an application manager for managing the resource requirements for applications in a shared computing environment.

Embodiments also provide for new distributed computing systems and methods that improve how data processing requests of computing devices of tenants in the same building or buildings located in proximity to each other by improving application availability and performance and providing for dynamic adjustments in the computing resources on which applications are hosted while reducing or minimizing bandwidth and latency limitations to improve network-based processing efficiencies, while also allowing multiple technology vendors, including Internet Service Providers (ISPs) and application service providers, to reach multiple users through a unified approach at the edge of a network. Embodiments improve upon traditional systems and methods that rely on communications with a centralized shared computing environment or a public cloud computing system (the Cloud), which are subject to bandwidth constraints, traffic jams, latency and jitter, and as a result of multiple hops and stops, increased risk and reduced data security, particularly since the geographic location of an end user's data is unknown or difficult to determine.

Embodiments provide for systems and methods that can establish and manage a plurality of Internet connections, software applications, and digital information in a shared computing environment in proximity to the end user, with each connection utilizing Internet connectivity, and each application comprising a plurality of application components, and each set of digital information provided or stored by the user or processed on behalf of the user. Systems and methods relate to the demand for distributed computing resources used for accessing and running software applications in a shared computing environment which is optimized to push processing to the edge of a network. Systems and methods enable an on-demand computing power, application/document server and data storage solution, which take advantage of Internet connectivity from one or more users in a building to a data center that is local or in proximity to the building (in contrast to a remote cloud computing system). The systems and methods improve application availability and performance, and allows dynamic adjustments in the computing resources on which applications are hosted. Embodiments access applications and data while minimizing the impact from limitations on bandwidth and latency to improve efficiency, reduce costs, and increase security to replace and enhance traditional information technology environments based on computing resources, which enables the reduction of bandwidth limitations and latency, and the rapid provisioning of new services and applications.

In certain embodiments, distributed computing systems and methods provide for automating and expediting access to and processing of information and applications for multiple users through a localized shared computing environment. A multi-user or building network device aggregates data processing request transmitted by end user network devices associated with end user computing devices in a building (e.g., office, store, residence). Multi-user or building network device aggregates data processing requests of various end user computing devices, e.g., in the same suite, space or unit of building, which transmits data processing request to a local shared computing environment located in proximity to the building, in which a set of servers, network equipment, processes and applications are housed to process, store, and manage the information, from which certain of information may be further transmitted to a public cloud computing system. Information and applications are subsequently transmitted back to the end user or other party designated by the originator of the information. With embodiments, applications, technology services and technology solutions may be made available at the localized shared computing environment for the end users thus enabling various functions, including, but not limited to: storing, processing or analyzing the information based on applications or instructions of the user or one or more third parties, facilitating additional applications to be enabled for the user; facilitating one or more telecommunication connections; facilitating the transfer of information upon a rules based system to a central shared computing environment; processing of information closer to the source of the information; and the returning of information from the localized shared computing environment and/or the cloud, to the end user or third parties based on a rules based system and method implemented by the operator of the localized shared computing environment and the end user.

According to one embodiment, a networked computing system includes a multi-user network device and a local shared computing device located in proximity to the end user. The multi-user network device is in communication with respective end user network devices of or associated with respective end user computing devices. End user network devices are operable to aggregate respective data processing requests from respective end user computing devices of respective tenants. The multi-user network device is operable to aggregate respective data processing requests received from respective end user network devices. Thus, for example, multi-user network device may aggregate data processing requests generated by a computing device of an accountant on the tenth floor of an office building, data processing requests generated by a computing device of an engineering firm computer on the fifth floor of the office building, and data processing request generated by a software engineering firm on the eighth floor of the office building. The shared computing system is local and located in proximity to the user and is in communication through respective networks with and the multi-user network device, and local shared computing system may also in communication with a public, remote cloud computing system. The local shared computing system located in proximity to the end user is operable to receive respective data processing requests from the multi-user network device, determine how execution of respective data processing requests should be allocated between the shared computing system located in proximity to the end user and the centralized shared computing system, and transmit respective results of executing respective data processing request to the multi-user network device, which then transmits respective results to respective end user network devices in response to respective end user computer requests. System embodiments may further comprise respective end user network devices of or associated with respective end user computers and/or a public cloud computing system.

In a single or multiple embodiments, end user computing devices are physically located in a single building and end user computing devices of respective unrelated tenants of the building, e.g., for different or unrelated tenants in the same office building, for different tenants in different related office buildings or office buildings under common managements, or for different tenants in different office buildings in geographic proximity to each other, e.g., on the same street, in the same area or neighborhood or within a pre-determined distance of each other. Proximity may also be data transmission proximity so that the local shared computing system such as MSCE is located in data transmission proximity relative to the multi-user network device such that data transmission between the local shared computing system.

In a single or multiple embodiments, building or multi-user network device and local shared computing system communications are enhanced or optimized by such communications being completed by reducing or minimizing a hop count, e.g., less than a pre-determined maximum hop count, which in one embodiment, is one hop count.

In a single or multiple embodiments, multi-user network device may also be in communication with at least one end user network device of or associated with a first end user computing device of a first tenant located inside of the building and at least one end user network device of or associated with a mobile communication device of the first or different, second tenant of the building so that a mobile communication device located outside of the building is in communication the multi-user network device.

In a single or multiple embodiments, respective end user computing devices are in communication through respective networks with respective internet service provider servers, and the local shared computing system may also be in communication with respective internet service provider servers for redundancy.

In a single or multiple embodiments, networked computing systems are structured so that the multi-user network device is a shared component that is not in direct communication with the public cloud computing system, and the end user network devices of or associated with the end user computing devices are also not in direct communication the local shared computing system with the intermediate multi-user or building network device.

In a single or multiple embodiments, the local shared computing system is a private computing system for respective tenants of the building, whereas the cloud computing system is not and is public such that the public cloud computing system is operable to execute processing requests of respective end user computing devices of respective users who are not tenants of the building. This system configuration provides for distributed local and remote execution of data processing requests and provides for location execution to improve security by maintaining local control over data while reducing processing times thus providing for more efficient request processing.

In a single or multiple embodiments, respective end user network devices and the multi-user network device are located within the same building or in different buildings associated with each other or in proximity to each other. Thus, the local shared computing system may be located in the same building as tenants or end users, tenant or end user computing devices, tenant or end user network devices and the multi-user network device, or in a second building in proximity to a first building housing tenants or end users, tenant or end user computing devices and associated end user network devices such that the local shared computing system is always located in the same building or local relative to a building being serviced. In contrast, the public cloud computing system or service is always located remotely relative to a tenant building, multi-user network device, end user network devices and the local shared computing system.

In a single or multiple embodiments, the multi-user network device is operable to transmit respective data processing requests to the local shared computing system according to a network aggregation rule. In a single or multiple embodiments, a network aggregation rule specifies that the multi-user network device aggregates data processing requests and transmits aggregated data processing request to the local shared computing system in response to a.) data processing requests have been received from a pre-determined minimum number of end user computing devices of respective tenants of the building, b.) data processing requests have been received from a pre-determined number of end user computing devices of respective tenants of a first building and received from a pre-determined number of end user computing devices of respective tenants of a second building, and/or c.) a pre-determined aggregation time.

In a single or multiple embodiments, the local shared computing system is operable to execute a data processing request to store or update information stored at the local shared computing system, execute an application hosted or accessible by the local shared computing system, analyze at least one of data received from the multi-user network device and data generated by generated by execution of an application hosted or accessible by the local shared computing system, and/or retrieve stored or processed content from a content source through an Internet connection. For example, the local shared computing system may provide an Internet service (one or more of Internet access, web hosting, email, webmail, domain name management, colocation services and an e-commerce application) and/or an enhanced productivity service or solution (one or more of a virtual desktop, software as a service, voice over internet protocol, cloud storage, data replication, data segregation for regulatory compliance, business continuance with data loss protection services, offsite backup and data storage, rapid provisioning of technology solutions and services, bandwidth arbitrage, infrastructure monitoring and support, streaming media, data caching, hosted business application, and real time data caching and processing).

In a single or multiple embodiments, data of processing requests may be encrypted before being transmitted to the local shared computing system, and the local shared computing system may also perform encryption before transmitting a data processing request or portion thereof to a public cloud computing system. Results generated by the local shared computing system and/or public cloud computing system may also be encrypted before being transmitted back to the multi-user networking device.

In a single or multiple embodiments, the local shared computing system is operable to determine how to allocate execution of the data processing requests between the local shared computing system and the public cloud computing system according to pre-determined allocation criteria, which may involve one or more pre-determined criteria such as a type of data processing request (e.g., more involved artificial intelligence processing may be transmitted to remote public cloud computing system rather than being executed remotely by local shared computing system), sensitivity or security of data of a data processing request (e.g., sensitive or secure data may be processed locally by shared computing system for enhanced security), and load balancing between the local shared computing system and the public cloud computing system. Thus, embodiments may involve the local shared computing system being operable to locally execute all of the data processing requests received from the multi-user network device such that the local shared computing system does not communicate with the public cloud computing system, and the local shared computing system is operable to transmit respective results of the local shared computing device locally executing respective data processing requests to the multi-user network device. The local shared computing system may also locally execute certain data processing requests to locally generate results, transmit other data processing requests to the public cloud computing system for remote processing, receive remotely generated results from the public cloud computing system, and then transmit the locally generated and remotely generated results to the multi-user network device (serially as results are generated or received or after all results have been aggregated). The multi-user network device segregates the results (e.g., according to a user identifier or profile) and then distributes respective results to respective end user network devices.

Thus, embodiments provide for new shared computing environments between the user and the cloud, which may include hardware and software infrastructure configured to form a system including multiple distributed computing resources that may be shared among different users in the network. With embodiments, a new shared computing environment is provided to process information, data, and applications closer to one or more users, e.g., closer to tenants of an office, store or residence, with particular application for tenants of the same building even when those tenants are unrelated to each other by aggregating processing request of multiple, unrelated tenants in the same building or in different buildings in proximity to each other.

For example, a multi-user network device aggregates information with one or more other tenants in the building for processing and transmission to a shared computing environment located in proximity to the building such as a MSCE, in which a set of servers, network equipment, processes, and applications store, and manage the information. Processing of end user requests with this configuration improves network/Internet attributes and parameters such as latency, throughput, security, data isolation, data congestion on the Internet, and context and location awareness. By placing transactions and resources closer to tenants and at the edge of the network, embodiments may also lower costs and improve efficiencies for the user by reducing data movement across the network and reducing congestion and traffic. As one example, data may be siloed and geographically identified to a shared computing system such as a MSCE, which geographic identification enables regulatory compliance that cannot exist in a public cloud computing system. This configuration also eliminates many bottlenecks resulting from centralized computing systems, improves security of encrypted data as it stays closer to the user, and enables regulatory compliance for segregated data.

Embodiments are thus structure and operate in contrast to traditional computing environments in which an application is generally provided with a dedicated set of computing resources for running that particular application or with end user computers accessing an application in the cloud with associated shortcomings such as latency, bandwidth consumption and security issues. System and method embodiments enable multiple users to share multiple resources in a shared computing environment and enable such functionality without requiring the application computer code to be modified as a result of networked computing systems structured to include a shared application manager for resource requirements for applications in a shared computing environment.

Networked computing systems and methods performed by computer system components in a network pushes processing to the edge of a network, e.g., for processing of multiple, unrelated tenants in the same office building. Embodiments improve application availability and performance and allow dynamic adjustments in the computing resources on which applications are hosted. Embodiments can access applications and data while minimizing bandwidth and latency limitations to improve efficiency and reduce costs while enabling multiple technology vendors, including Internet service providers, and application service providers to reach multiple user through a unified approach at the edge of a network.

Other embodiments are for computer-implemented methods executed within distributed networked computing systems described above. Computer-implemented methods may involve or be executed by one or multiple components of a shared computing environment. Computer-implemented methods may also involve or be executed by one or multiple components inside of a building and/or in proximity to a building. Other computer-implemented methods may involve or be executed by one or more components inside of a building and/or proximity to a building and by a public cloud computing system.

Yet other embodiments are for a non-transitory computer readable medium tangibly embodying one or more sequences of instructions wherein execution of the one or more sequences of instructions by one or more processors contained in a computing system of a distributed networked computing system according to embodiments.

Various additional aspects and details of embodiments are described in further detail with reference to the drawings.

BRIEF DESCRIPTION OF THE DRAWINGS

The foregoing aspects and attendant advantages of the embodiments described herein are reflected in the following description read in conjunction with the accompanying drawings wherein.

DETAILED DESCRIPTION OF ILLUSTRATED EMBODIMENTS

Embodiments relate to networked computing systems and methods performed within a computer network for establishing Internet connections and managing software applications in a shared computing environment. Embodiments provide a networked architecture designed to replace and enhance traditional information technology environments based on computing resources to reduce latency and allow for rapid provisioning of services and applications. Embodiments address challenges existing in the flow, processing, and storage of data in networked computing systems and provide for creation of a comprehensive, efficient and integrated networked computing system solution that gives users visibility and control of their resources.

Certain embodiments provide a distributed computing environment shared among different, unrelated end users (such as tenants of an office building) that can also leverage cloud computing resources when needed while processing information, data, and applications closer to a building or closer to end users or tenants in a building. For this purpose, data processing requests generated by computing devices of different office building tenants are aggregated and processed, which may involve local processing and/or remote or cloud-based processing. A local shared computing system in proximity to the office building locally executes data processing requests (thus providing, for example, more efficient processing with reduced latency and bandwidth requirements while providing enhanced security and local control over end user data). Embodiments may execute without transmission to a remote and public cloud computing system, or some or all data processing requests may be transmitted to a public cloud computing system to be "remotely" executed. Results generated locally and remotely are received or aggregated by the local shared computing system and transmitted and distributed to respective end user computing devices in response to respective data processing request.

Figure 1:
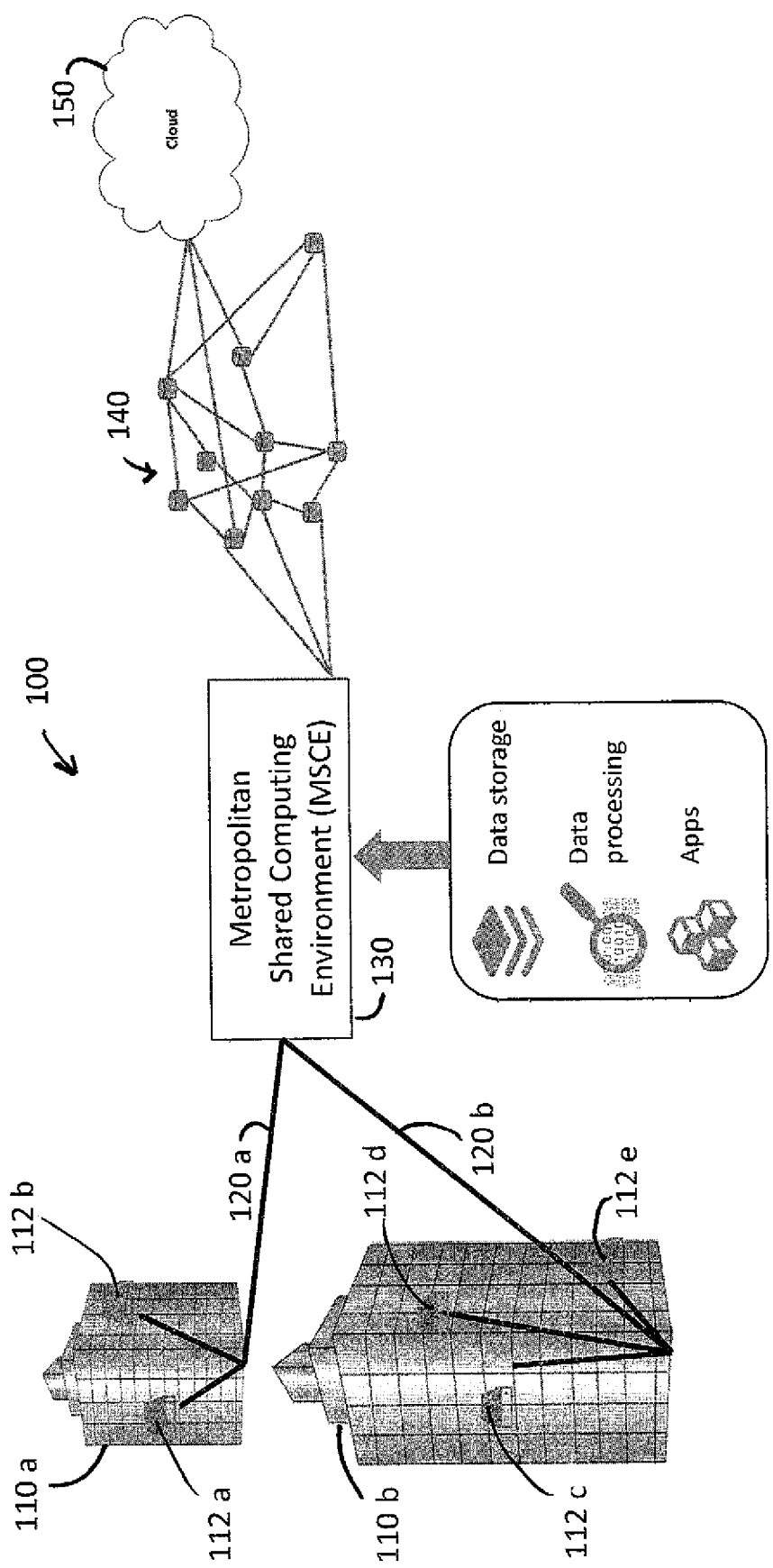
FIG. 1 depicts a distributed computing system architecture involving multiple tenant buildings according to one embodiment.

Referring to FIG. 1, a distributed computing system or shared computing environment 100 constructed according to one embodiment establishes and manages a plurality of Internet connections, software applications, and digital information. As shown in FIG. 1, a first building 110a and a second building 110b include respective tenants or end users using respective end user computing devices 112a-b. As generally illustrated in FIG. 1, end user computing devices 112a-b are used by one or more tenants in building 110a, and end user computing devices 112c-e are used by one or more tenants in building 110b.

FIG. 1 illustrates an embodiment involving multiple buildings 110a, 110b, but it will be understood that embodiments may involve additional buildings 110 or only a single building 110. Thus, end users or tenants may be in the same building 110 or in multiple buildings. Multiple buildings 110, however, are in proximity to each other (e.g., geographic and/or data transmission proximity, such as within pre-determined distance, in a certain zip code or neighborhood, or network connection established with certain number of hops or using certain number of nodes of a network connection 120 between a building 110 and a local shared computing system 130). Further, while reference is made to a building 110 such as an office building, embodiments may involve a building 110 of an office or factory (commercial), store (retail) or home or apartment (residential). Additionally, a particular office in building 110 may include one or multiple end user computing devices 112. For example, an office tenant may be a solo accountant who has one computing device such that the accountant's office includes a single end user computing device 112, whereas a medical office in building 110 may include multiple end user computing devices 112. Thus, reference is made generally to a building or office 100 thereof and multiple end user computing devices 112 in building or office 100 for ease of explanation and illustration.

With continuing reference to FIG. 1, buildings 110a, 110b are connected to a local and private shared computing system 130 (generally, local shared computing system 130). More particularly, according to embodiments, building 110a is connected to local shared computing system 130 via a network connection 120a, and building 110b is connected to local shared computing system 130 via a network connection 120b (generally network connection 120). Thus, as depicted in FIG. 1, individual end user computing devices 112 are not directly connected to local shared computing system 130, and as described in further detail with reference to FIGS. 2-7, network connections 120 are "building-level" network connections between a building 110 and local shared computing system 130 rather than "end user level" network connections. Data processing requests generated by multiple end user computing devices 112a-b in building 110a are indirectly communicated to local shared computing system 130 via network connection 120a, and data processing requests of multiple end user computing devices 112c-e in building 110b are communicated to local shared computing system 130 via network connection 120b. With embodiments, local shared computing device 130 may be in direct communication with remote, public cloud computing system 150 (referred to public cloud computing system or the cloud 150) via network connection 140, and building-level (rather than end user-level) network connections 120 are used for communicating end user computing data processing requests to local shared computing system 130. This distributed architecture is in contrast to known systems for accessing cloud computing resources in which end user computing devices establish their own separate and dedicated network connection to cloud environment.

Local shared computing system 130 is private since it is dedicated to buildings 110a and 110b and configured for local execution of data processing requests of end user computing devices 112 in buildings 110, or for end user computing devices 112. In other words, local shared computing system 130 is a private and local system for buildings 110a, 110b in geographic proximity (e.g., in certain building 110, in a related or associated group or suite of buildings, within pre-determined distance, in certain zip code or neighborhood) and/or in data transmission proximity (such that network connection 120 between building 110 and local shared computing system 130 can be established with a certain number of hops or using certain number of nodes). Thus, local shared computing system 130 is in contrast to public and remote cloud 150, which can be accessed by other third parties in different cities, states and throughout the world. In this manner, private and local shared computing system 130 may selectively leverage public and remote cloud computing system 150 and send data processing requests to public cloud computing system 150 for execution in public cloud computing system 150, but public cloud computing system 150 does not send data processing requests of unrelated (and unknown) third parties to private and local shared computing system 130 for execution. For ease of explanation and illustration, reference is made generally to local shared computing system 130, which is private for a single building 110 or multiple buildings 110 in proximity to each other, cloud or public cloud computing system 150, which is public and remote relative to buildings 110a, 110b and local shared computing system 130.

Local shared computing system 130 provides data storage, computation, processing and security functions and application services, and does so "locally" near, or in proximity to, end users or buildings 110. In this manner, data storage, data processing and application processing can be executed "locally" by "private" shared computing system 130 rather than "remotely" in in "public" cloud computing system 150. As a result, embodiments reduce traffic associated with public cloud computing system 150 communications and associated latency, while locally consolidating control of security and providing for known location of data and improving performance. Moreover, by moving one or more of data storage, data processing and application execution toward the edge of the network closer to end user computing devices 112 and buildings 110, remaining data processing requests sent to public cloud computing system 150 for execution consume less bandwidth, and an express node 142 route can be selected for network connection 140 between local shared computing system 130 and public cloud computing system 150. The communication path 140 between local shared computing system 130 and public cloud computing system 150 can be intelligently assessed and selected based on the fewest number of nodes 142 to cloud 150. The assessment may be from analytics of nodes 142 in transit or pre-arranged pathways with the host provider at cloud 150.

Figure 2:
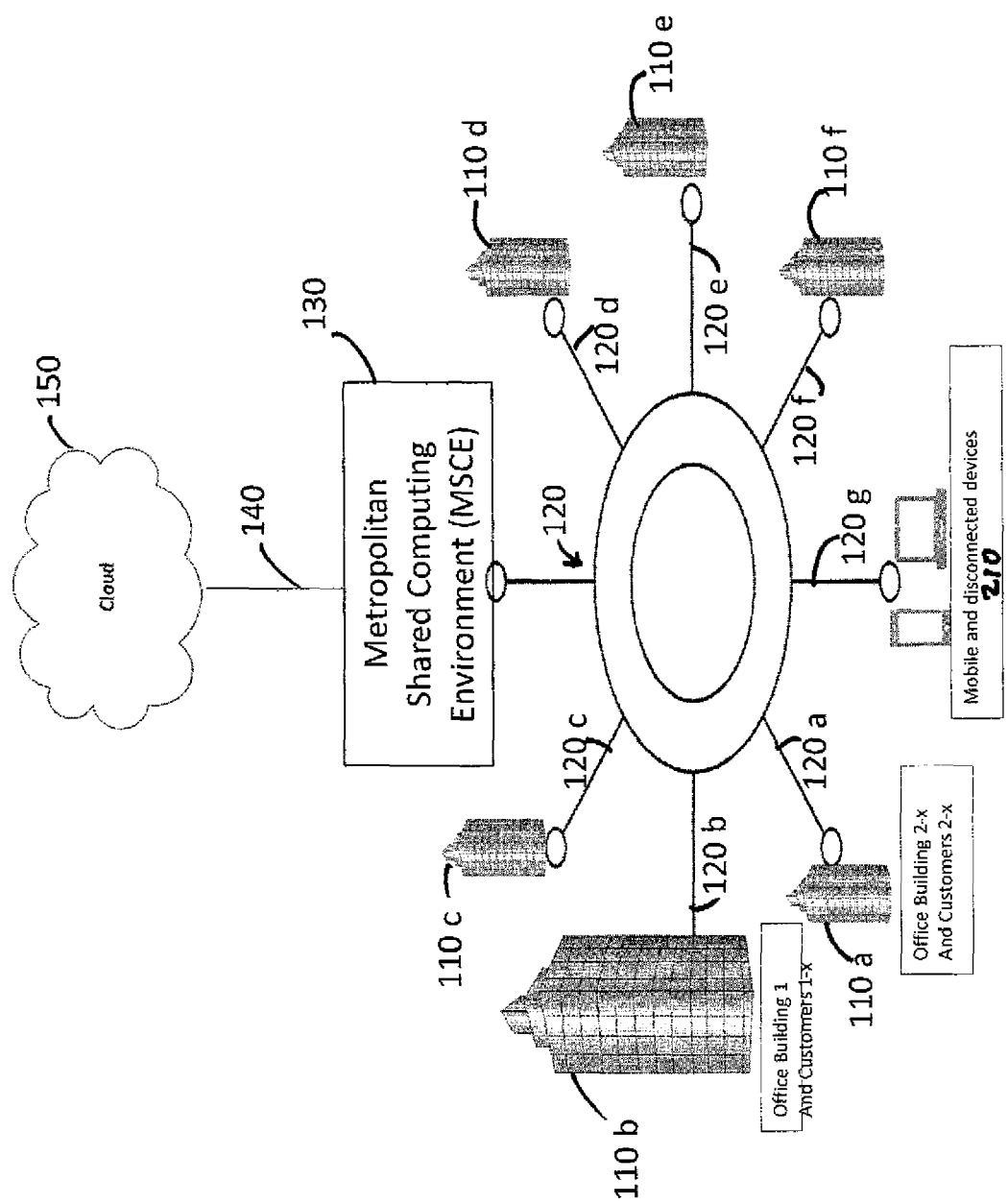
FIG. 2 depicts a distributed computing system architecture involving multiple tenant buildings and a mobile communication device according to one embodiment.

Referring to FIG. 2, a distributed networked computing system constructed according to one embodiment for establishing and managing a plurality of Internet connections, software applications, and digital information in a shared computing environment is depicted. FIG. 2 depicts multiple buildings 110a-f in communication through respective building level network connections 120a-f to local shared computing system 130, and connection of one or more end user mobile communication devices 210, which may be physically located outside of building 110, through network connection 120g to shared computing system 130. While FIG. 2 illustrates multiple buildings 110, embodiments may involve a single building 110 and end users or tenants within the same building 110. Further, while FIGS. 1-2 illustrate embodiments in which a tenant or end user computing device 112 is located inside of a building 110, embodiments may also involve connection of end user or tenant computing devices 112 such as a mobile communication devices 210 located outside of building 110 and in communication with shared computing system 130 via network 120g. Accordingly, FIGS. 1 and 2 are provided to generally depict different embodiments of distributed computing system architectures and for ease of illustration and explanation, and not limitation, reference is made to end user or tenant computing devices 112 inside of building 110.

Figure 3:
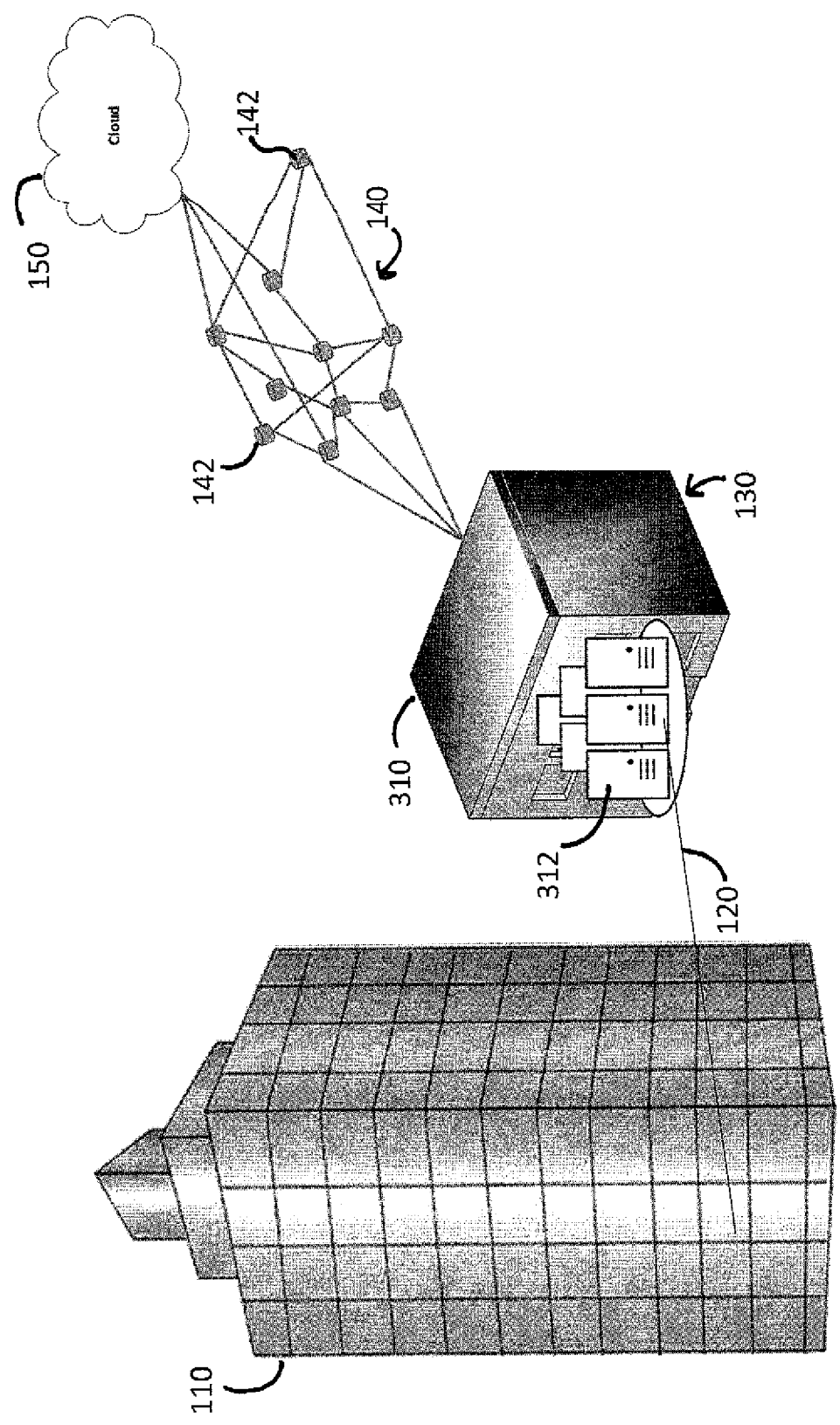
FIG. 3 depicts a distributed computing system constructed according to one embodiment in which end users or building tenants are connected to a local shared computing system such as a Metropolitan Shared Computing Environment (MSCE), which in the illustrated embodiment, connects to a centralized data center via various Internet connections.

Referring to FIG. 3, one manner in which embodiments may be structured is depicted in which local shared computing system 130 is connected to building 110 through network connection 120 of an Internet communication path. Local shared computing system 130 according to one embodiment is structured as a data center 310 such as a local Metropolitan Shared Computing Environment (MSCE), located in proximity to building 110.

Building 110 includes communication equipment such as managed network equipment, servers, and switches, which may include one or more virtualized servers, switches, and equipment, to connect to MSCE 310. A segmented or dedicated portion 312 of MSCE 310 is utilized for local processing of data as discussed above with reference to FIGS. 1-2. For ease of explanation, reference is made to MSCE 310 and generally to local shared computing system 130. As depicted in FIG. 3, and as described above with reference to FIGS. 1-2, MSCE 310 connects through network connection/Internet 140 through a series of one or more nodes 142 to centralized cloud computing environment or system 150.

Figure 4:
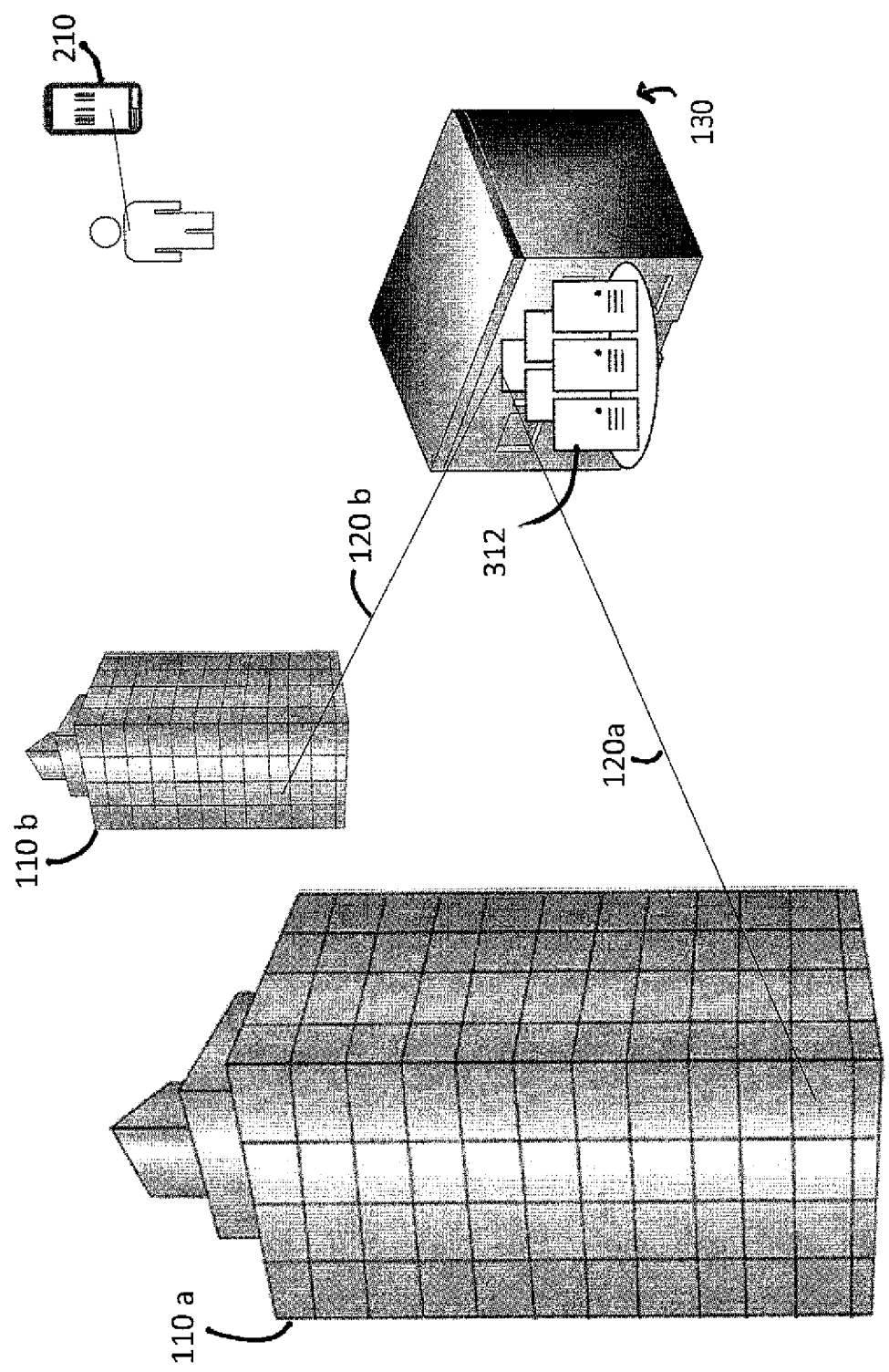
FIG. 4 depicts a distributed computing system constructed according to one embodiment including multiple buildings and a local shared MSCE shared by end users or tenants of multiple buildings in proximity to the end users or tenants.

FIG. 4 depicts a distributed networked computing system constructed according to one embodiment including local shared computing system 130 in the form of MSCE 310 or portion 312 thereof, and further illustrating an end user with mobile communication device 210 (outside of building 110) that may access local shared computing system 130 and MSCE 310 as described with reference to FIG. 2.

Figure 5:
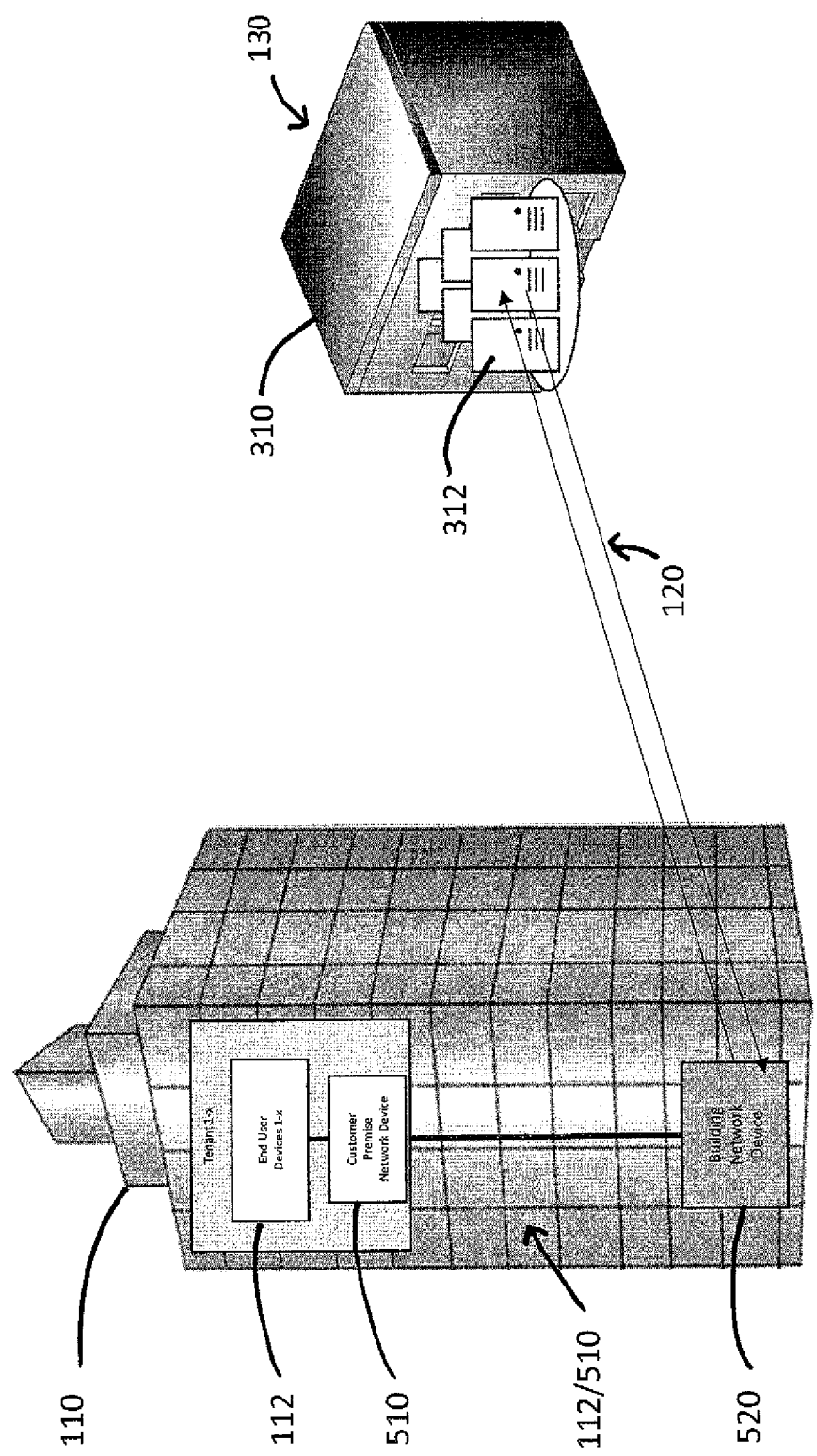
FIG. 5A depicts one embodiment of a distributed computing system constructed according to one embodiment that includes in-building and local shared MSCE components and in which building includes end user or premise network devices and a multi user or building network device that is in communication with local shared MSCE.
FIG. 5B is a block diagram of an exemplary multi-user or building network device may be configured and operate.
FIG. 5C is a block diagram illustrating in further detail components of a distributed computing system constructed according to one embodiment including local shared MSCE components and connectivity.
FIG. 5D illustrates an exemplary local shared MSCE infrastructure.
FIG. 5E is a block diagram illustrating an exemplary local shared MSCE configuration and operation.
Figure 5B:
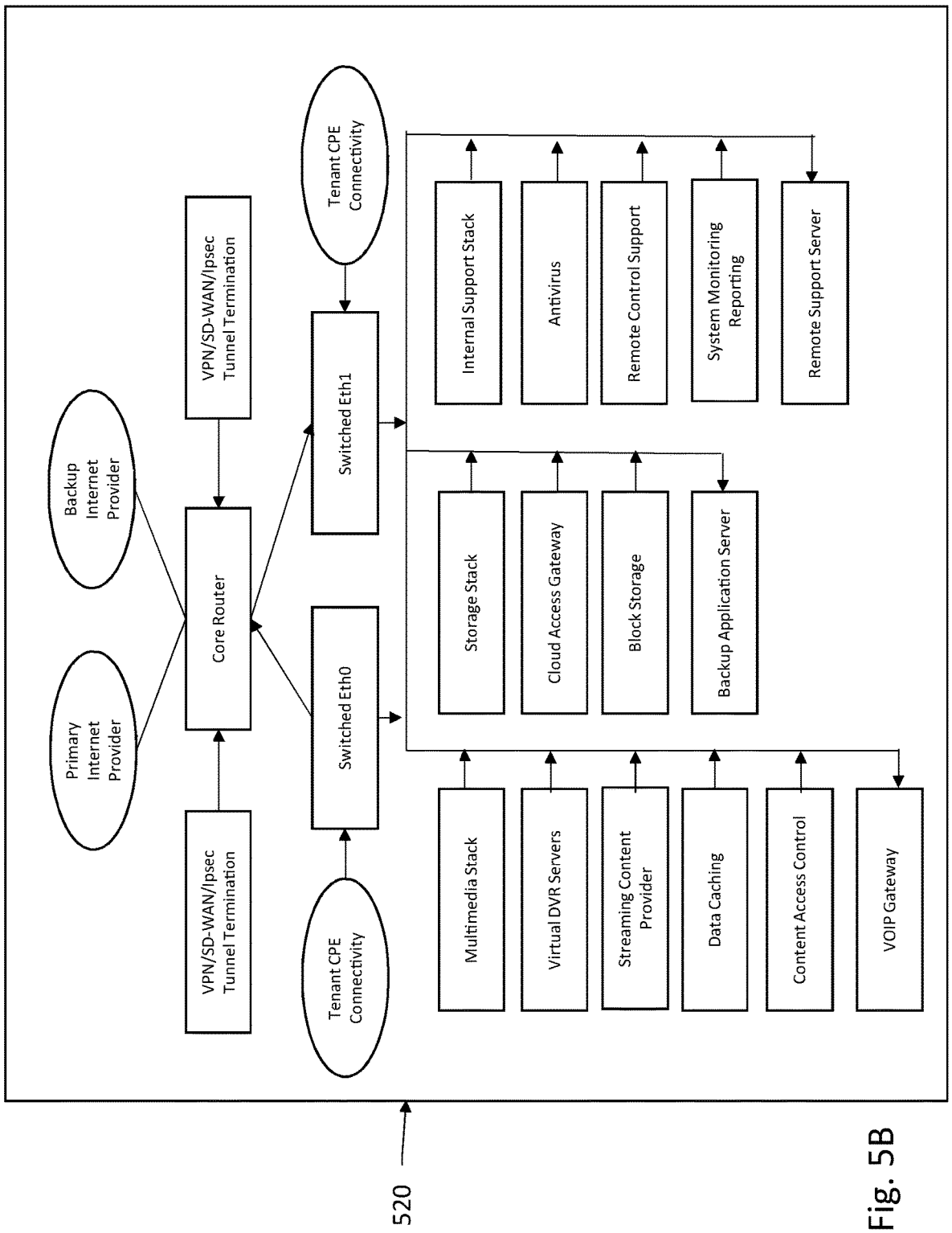

Referring to FIGS. 5A-B, each end user or tenant within building 110 uses a computing device 112 such as a computer, laptop, desktop, smartphone, tablet, or phablet. FIG. 5A provides an illustrative example of end user/Tenant 1 including one or more end user computing devices 112 (1-x), and other tenants (Tenant 2-x), each of which may also include one or more other end user computing devices 112. In the illustrated embodiment, each end user computing device 112 includes or is connected to or in communication through a cable, fiber, or wireless connection with an end user specific network device 510, identified as "premise network device" in FIG. 5A. For ease of explanation, reference is made to end user network device 510. While FIG. 5A illustrates a single end user network device 510, respective tenants or offices may include respective end user network devices 510. End user network device 510 is an interface device for all users within the office suite and communicates information to a different, multi-user or building network device 520, which is also illustrated as being within building 110. Thus, respective end user computing devices 112 in respective offices of building 110 utilize respective end user network devices 510, which communicate with building or multi-user network device 520 via wired or wireless in-building connection.

FIG. 5B illustrates one example of how multi-user or building network device 520 may be configured and operate. In the illustrated example, multi-user or building network device 520 includes various computer network equipment, programs, and processes to transmit information and applications to and receive information and applications from MSCE 310 and includes one or more routers, switches, servers and transceivers to interact with, transmit and receive digital information. Multi-user network device 520 can monitor information, provision service or applications, and encrypt data to provide local, in-building data processing system as well as a monitoring and management system.

For example, multi-user network device 520 may include a network router, a Gigabit Ethernet switch, and various transceivers to interconnect the physical media coming into a building and heading up the riser (copper, fiber optics, twisted pair, etc.). Located in a secured cabinet in building 110, multi-user network device 520 is used as a termination point for external telecommunication connections, and a gateway to tenant suites through end user computing devices 112 in building 110. In addition, multi-user network device 520 may maintain a constant connection back to MSCE 310, which serves several functions including allowing technicians to monitor and provision services quickly and remotely over a secured network connection;

allowing tenants access to services housed within the MSCE 310 in a fast, reliable, and secure manner; and serving as a backup Internet connection to building thus allowing customers to be provisioned with temporary Internet access immediately without having to wait for a traditional telecommunications carrier to provision service.

Multi-user or building network device 520 also allows end user computing device 112, or end user or premise network devices 510, to provide a redundant Internet connection to tenant should their primary Internet provider fail. Multi-user network device 520 can also provide the platform for a wide array of data security for multiple tenants in building 110. This uniquely enables data intrusion protection and monitoring for enhanced data security.

Figure 5C:
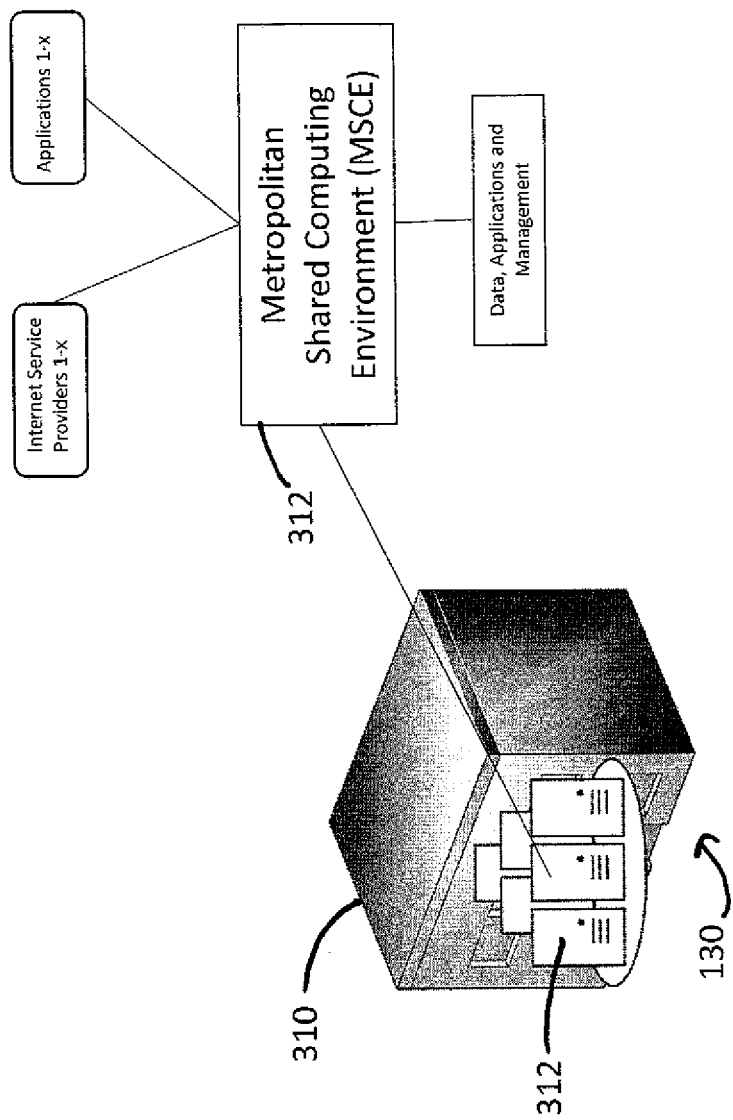

With continuing reference to FIGS. 5A and 5C, building network device 520 is also in communication with local shared computing system 130/MSCE 310 via cable, fiber, or wireless connection 120. MSCE 310 is located in proximity to building 110 measured in distance or by data transmission through a maximum number of hops, generally limited to only one hop to optimize building 110—local shared computing system 130 communication. FIG. 5C further illustrates that local shared computing system 130/MSCE 310 is in communication with Internet Service Providers.

Figure 5D:
Figure 5E:
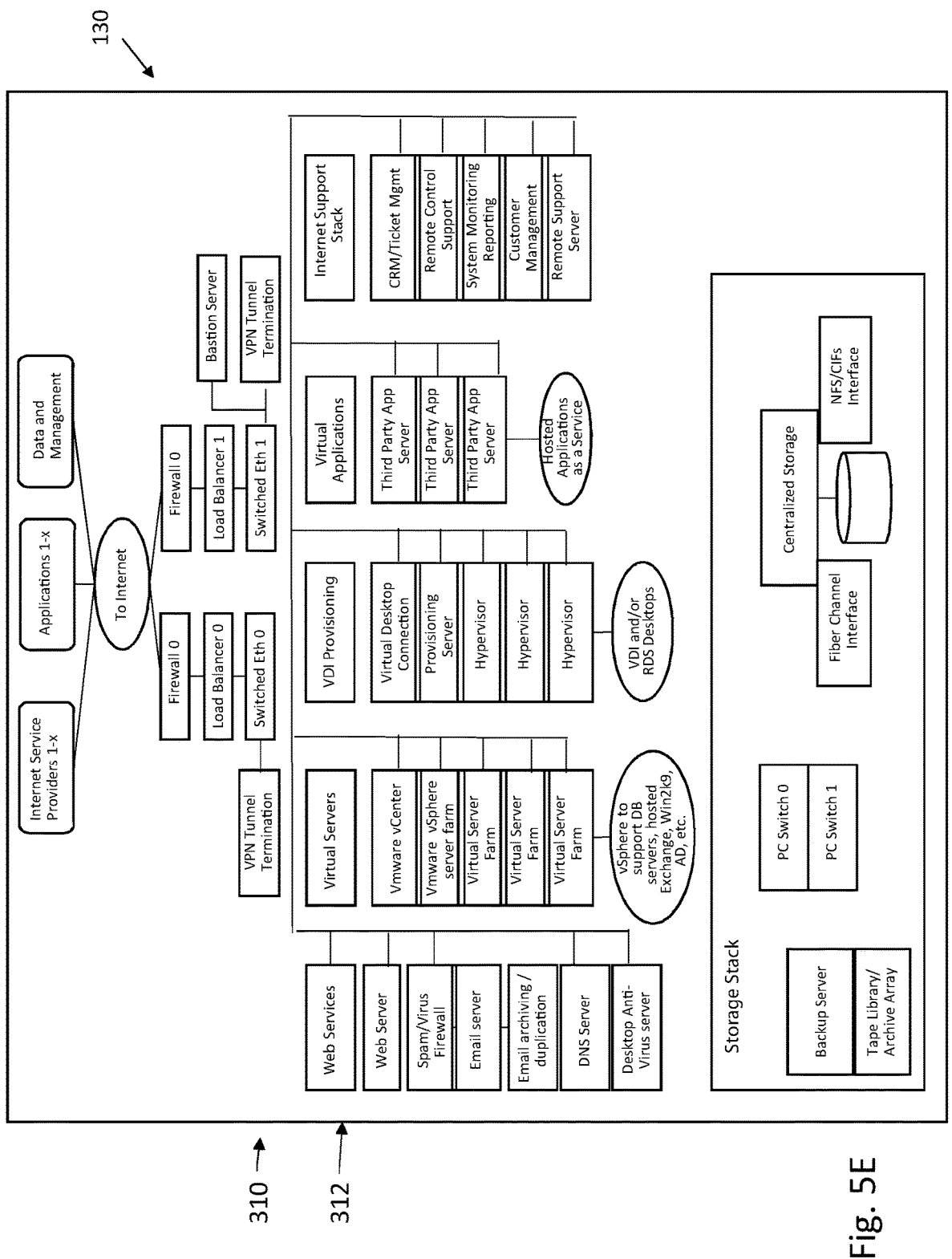

FIGS. 5D-E illustrate examples of how local shared computing system 130/MSCE 310 may be configured and operate. MSCE 310 is in communication with multi-user or building network device 520 and public cloud computing system 150, and as shown in FIG. 5E, also interfaces with one or more Internet service providers, one or more application service providers and with data, applications and management features.

Local shared computing system 130/MSCE 310 is located in proximity to building 100 and is a private computing resource for building 100, in contrast to remote and public cloud computing system 150. Local shared computing system 130/MSCE 310 includes one or more routers, switches, servers, and various transceivers to interact with digital information and is capable of monitoring information, provisioning service or applications, and encrypting data. Local shared computing system 130/MSCE 310 provides a local data processing system as well as a monitoring and management system. Applications, data storage, data processing, data analytics, and various other computing processes or applications may be accessed, utilized, or stored at MSCE 310. Building 110 has a secure, encrypted connection back to MSCE 310 via multi-user or building network device 520.

Local shared computing system 130/MSCE 310 serves as a central monitoring and management portal and allows for a variety of enhanced services to be provided from a centralized location. Remote offsite backup, cloud applications, network monitoring, and remote desktop control are all services made available to tenants via the MSCE 310 infrastructure. MSCE 310 allows for secure Virtual Private Networks to be established between parties at different buildings 110 within the ecosystem thus allowing office to office, home to home, or home to office, secure communication without having to traverse the public Internet 140. MSCE 310 includes an array of virtual servers, network switching and routing equipment.

Having described how distributed computing and shared computing environments of embodiments can be structured, further details of how embodiments may operate and associated processing flows, rules and algorithms are described in further detail with reference to FIGS. 6-7.

Figure 6:
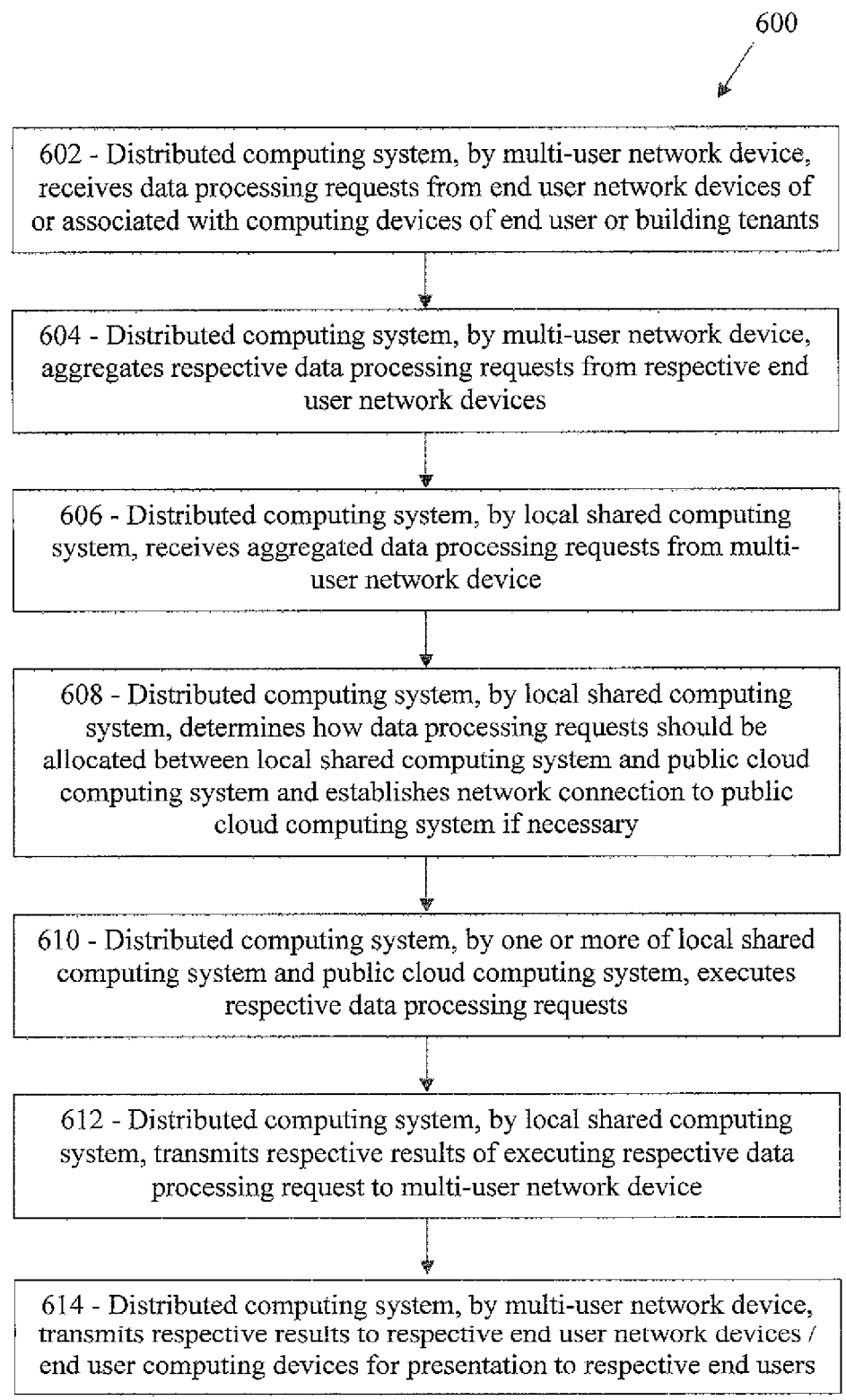
FIG. 6 is a flow diagram of one embodiment for processing data requests utilizing distributed computing systems constructed according to embodiments.

Referring to FIG. 6, in a computer-implemented method 600 according to one embodiment, at 602, distributed computing system, by multi-user or building level network device 520 receives data processing requests from end user network devices 510 of or associated with end user computing devices 112 of multiple building 100 tenants. For example, multi-user network device 520 may receive data processing request from end user network device(s) 510 associated with end user computing device(s) 112 of a medical office in building 100a and from end user computing device(s) 510 associated with end user computing device(s) 112 of unrelated graphics design firm also in building 100a, or medical office and graphics design firm may be tenants in different buildings 100a, 100b.

At 604, distributed computing system, by multi-user or building level network device 520, aggregates respective data processing requests received from multiple end user network devices 510, and at 606, distributed computing system, by local shared computing system 130/MSCE 310, receives aggregated data processing requests from multi-user network device 520.

At 608, distributed computing system, by shared computing system 130/MSCE 310, determines how execution of data processing requests should be allocated between local shared computing system 130/MSCE 310 and public cloud computing system 150. At 610, local shared computing system 130/MSCE 310 and/or cloud 150 execute respective data processing requests received from multi-user network device 520. At 612, distributed computing system, by local shared computing system 130/MSCE 310, transmits respective results of executing respective data processing requests (by local shared computing system 130/MSCE 310 and/or cloud 150) back to multi-user network device 520. At 614, results are segments or identified for respective end-user network devices 510 (e.g., based on an identifier or profile), and multi-user network device 520 transmits respective results to respective end user network devices 510 for presentation to end users via respective end user computing devices 112 in offices or suites in buildings 110a and/or 110b.

Figure 7:
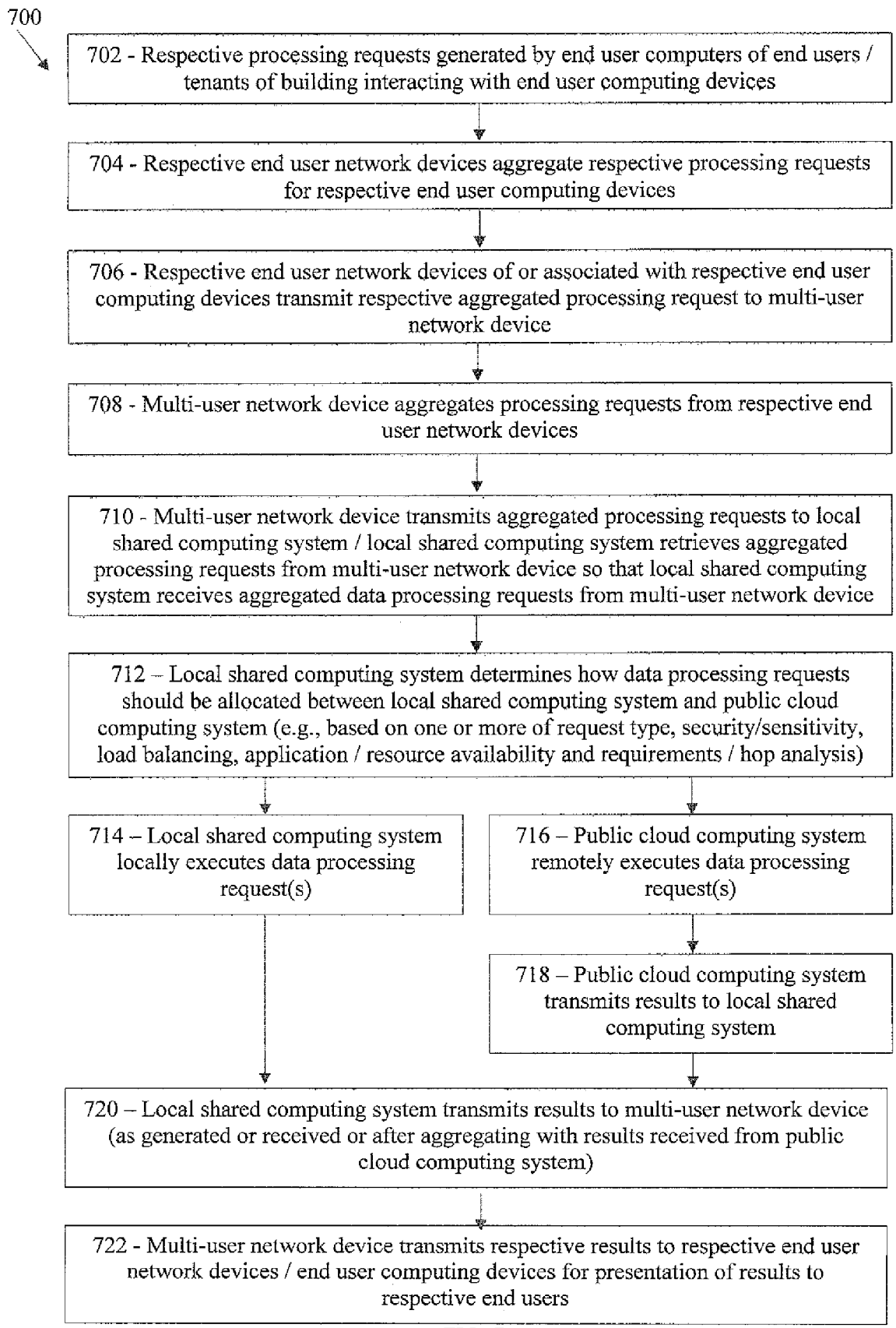
FIG. 7 is a flow diagram of one embodiment for processing data requests utilizing distributed computing systems constructed according to embodiments and how processing data requests may be allocated between local and private shared MSCE and remote and public cloud computing systems.

FIG. 7 illustrates a computer-implemented method 700 according to one embodiment and additional details about how certain data is generated, communicated and processed, and how multi-level, in-building data processing request aggregation may be utilized. At 702, respective processing requests are generated by multiple end user computers 112 of end users/tenants of building 110a and/or 110b interacting with end user computing devices 112. At 704, respective end user network devices 510 associated with an office or suite or with individual end user computing devices 112 aggregate respective processing requests for respective end user computing devices 112. At 706, respective end user network devices 510 of or associated with respective end user computing devices 112 transmit respective aggregated processing requests to multi-user or building network device 520, which aggregates processing requests from respective end user network devices 510 associated with different end user computing devices 112 in building 110a and/or 110b. For example, multi-user or building network device 520 may aggregate aggregated data processing requests received from end user network device(s) 510 associated with computing device(s) 112 of a medical office tenant in building 110a and aggregated data processing requests received from end user network device(s) 510 associated with end user computing devices (112) of graphics design office tenant in the same building 110a or in different building 110b in proximity to building 110a.

With continuing reference to FIG. 7, at 710, multi-user or building network device 520 transmits aggregated processing requests to local shared computing system 130/MSCE 310, or local shared computing system 130/MSCE 310 retrieves aggregated processing requests from multi-user network device 520, with the result that local shared computing system 130/MSCE 310 receives aggregated data processing requests from multi-user network device 520. Thus, data processing requests may be aggregated initially for a particular tenant by an end user or premise network device 510, and then multi-user or building network device 520 can aggregate data processing requests of multiple different tenants that were previously aggregated by end user or premise network device 510.

Aggregation of data processing requests by end-user network device 510 and transmission of same to multi-user network device 520, and aggregation of data processing requests by multi-user network device 520 and transmission of same to local shared computing system 130/MSCE 310 may be based on one or more aggregation/transmission rules.

For example, end user network device 510 may be triggered to transmit aggregated data processing requests received from end user computing devices 112 to multi-user network device 520 in response to an end user network device 510 receiving a pre-determined number of requests, receiving a request involving a pre-determined minimum number of tasks, receiving certain type of request or a request involving a certain type of processing or certain application or resource, or a combination of the forgoing. As another example, end user network device 510 may be triggered to transmit aggregated data processing requests received from end user computing devices 112 to multi-user network device 520 after a pre-determined amount of time since the first data processing request was received by an end user network device 510.

As a further example, multi-user network device 520 may be triggered to transmit aggregated data processing requests received from end user network device 510 to shared computing system 130/MSCE 310 according to or upon satisfaction of one or more network aggregation rules. An aggregation rule may specify that multi-user network device 520 aggregates data processing requests until data processing requests have been received from a pre-determined minimum number of end user computing devices 112 or pre-determined number of end user network devices 510 of respective tenants of one building 110a, a particular building, multiple buildings 110a-n, or a particular combination of buildings 110, that multi-user network device 520 transmits aggregated data processing requests to local shared computing system 130/MSCE 310 after a pre-determined time, and/or that multi-user network device 520 transmits aggregated data processing requests to local shared computing system 130/MSCE 310 in response to receiving a certain type of data processing request (e.g., involving certain imaging processing or more computing intensive request or analysis) and/or that multi-user network device 520 has received data processing requests from at least one end user computing device 112 or end user network device 510 of at least one tenant, or of a particular tenant, in first building 110a, and/or from at least one end user computing device 112 or end user network device 510 of at least one tenant, or of a particular tenant, in second building 110b.

With continuing reference to FIG. 7, at 712, local shared computing system 130/MSCE 130 determines how data processing requests should be allocated between local shared computing system 130/MSCE 130 and public cloud computing system 150. This analysis may be based on one or more execution allocation rules, for example, based on the type of data processing request, type of application and resource to be utilized, security or sensitivity of request data or security or sensitivity of a result generated, load balancing (e.g., if local shared computing system 130/MSCE 310 is or will be overloaded with processing, application/resource availability at MSCE 310 or cloud 150 and network analysis such as required bandwidth and latency).

In certain embodiments, local shared computing system 130/MSCE 310 executes all of the data processing requests received from multi-user network device 520 such that communication with public cloud computing system 150 is not necessary and communication via network 140 is not necessary. In other embodiments, all of the data processing requests are executed in public cloud computing system 150. In other embodiments, execution of data processing requests is distributed between local shared computing system 130/MSCE 310 and public cloud computing system 150 and local shared computing system 130/MSCE 310 will selectively connect to public cloud computing system 150 and transmit certain data processing request to public cloud computing system 150.

Thus, at 714, data processing request are executed by shared computing system 130/MSCE 312 locally and/or at 716, by centralized shared computing system or cloud 150, in which case, at 718, centralized shared computing system or cloud 150 transmits results of generated by executing data processing requests to shared computing system 130/MSCE 312.

At 720, local shared computing system 130/MSCE 310 transmits results to multi-user network device 520 (as generated or received, or after aggregating with results received from public cloud computing system 150), and at 722, multi-user network device 520 segments results for respective end user network devices 510 and transmits respective results to respective end user network devices 510/end user computing devices 112 for presentation of results to respective end users.

Local shared computing system 130/MSCE 310 is configured to transmit respective results of executing respective data processing requests to multi-user network device 520 as results are generated or received by local shared computing system 130/MSCE 310, and multi-user network device 520 is operable to distribute respective results received from local shared computing system 130/MSCE 310 to respective end user network devices 510. According to other embodiments, local shared computing system 130/MSCE 310 aggregates locally generated results generated by local shared computing system 130/MSCE 310 and remotely generated results and then transmits aggregated results to multi-user network device 520, which then distributes respective results to respective end user network devices 510 for respective end user computing devices 112. The network or Internet connection 140 between the local shared computing system 130 and public cloud computing system 150 may then be terminated after processing by the public cloud computing system 150 has been completed. In this manner, according to embodiments, local shared computing system 130 may selectively connect to and utilize public cloud computing resource when needed.

Thus, the distributed computing system and operation of same involving private and local shared computing system 130/MSCE 310, public and remote cloud computing system 150, in-building network devices 510, 520 for in-building communications and data processing request aggregation, and building 110 to local shared computing system 130/MSCE 310 interfaces provide various network and computer centric improvements and solve technological limitations with cloud-based systems and processing including reduced communications to and from cloud 150, reduced network bandwidth consumption for communications to and from cloud 150, reduced latency and jitter, enhanced security by retaining local control over data and associated processing at shared computing system 130/MSCE 310, ability to provision Internet access with 24 hours, automated redundant Internet connections with failover capabilities, network utilization and monitoring, remote desktop and server support (with on-site support as necessary), secure cloud services available without having to traverse the Internet or networks 140, secure remote backup across a private network and VOIP telecommunication. Embodiments may also optimize building 110—local shared computing system communications, e.g., by reducing or minimizing the number of hops or stops for such communications, and when optimized, using a single hop or stop. Further, data processing request aggregation (in building 100 by end user network devices 510 and/or by multi-user network device, and out of building 100 by local shared computing system 130/MSCE 310, and aggregating of generated results, may reduce communication instances and thus provide for more efficient network communications and processing of same.

Figure 8:
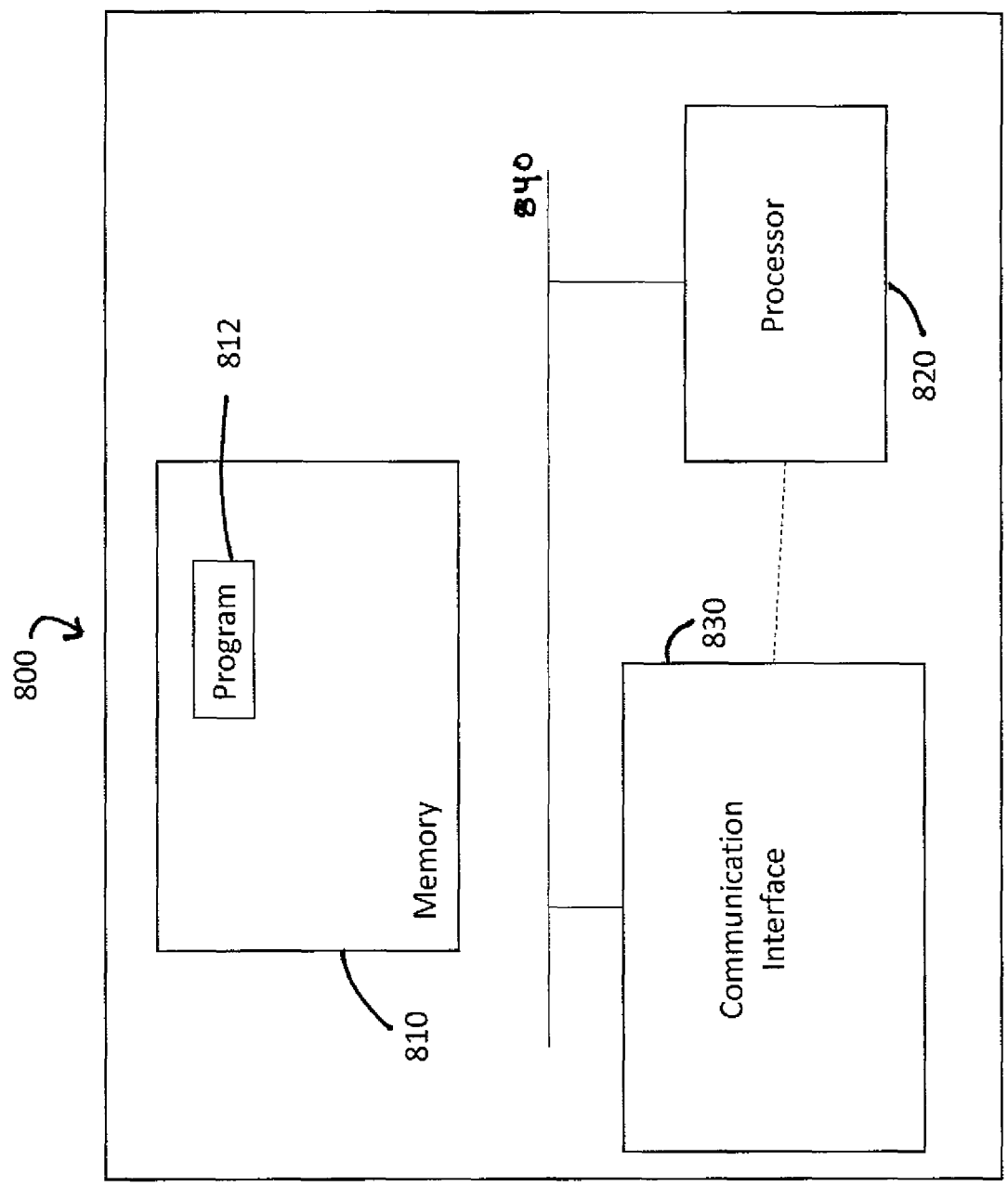
FIG. 8 is a block diagram of components of a computing system that may be utilized in embodiments.

FIG. 8 generally illustrates certain components of a computing device 800 that may be utilized to execute or that may embody components of embodiments. For example, the computing device may include a memory 810, program instructions 812, a processor or controller 820 to execute instructions 812, a network or communications interface 830, e.g., for communications with a network or interconnect 840 between such components. The memory 810 may be or include one or more of cache, RAM, ROM, SRAM, DRAM, RDRAM, EEPROM and other types of volatile or non-volatile memory capable of storing data. The processor unit 820 may be or include multiple processors, a single threaded processor, a multi-threaded processor, a multi-core processor, or other type of processor capable of processing data. Processor 820 performs steps or executes program instructions 812 within memory 810 and/or embodied on the carrier to implement method embodiments.

Depending on the particular system component (e.g., whether the component is a computer, a hand held mobile communications device, or devices with embedded computing capabilities, such as Internet of Thing devices), the interconnect 840 may include a system bus, LDT, PCI, ISA, or other types of buses, and the communications or network interface may, for example, be an Ethernet interface, a Frame Relay interface, or other interface. The network interface 830 may be configured to enable a system component to communicate with other system components across a network which may be a wired or wireless or with various other networks. It should be noted that one or more components of computing device 800 may be located remotely and accessed via a network. Accordingly, the system configuration provided in FIG. 8 is provided to generally illustrate how embodiments may be configured and implemented.

Method embodiments or certain steps thereof, some of which may be loaded on certain system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, holographic devices; magneto-optical media; and hardware devices that are specially configured to store and execute program code, such as programmable microcontrollers, application-specific integrated circuits ("ASICs"), programmable logic devices ("PLDs") and ROM and RAM memory devices, and other carriers now known or later developed capable of storing data.

Embodiments may be implemented utilizing computer code may include machine code, such as produced by a compiler or other machine code generation mechanisms, scripting programs, and/or other code or files containing higher-level code that are executed by a computer using an interpreter or other code execution mechanism. For example, some embodiments may be implemented using assembly language, Java, C, C#, C++, scripting languages, and/or other programming languages and software development tools as are known or developed in the art. Other embodiments may be implemented in hardwired circuitry in place of, or in combination with, machine-executable software instructions.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

The processes and infrastructure may vary based on the requirements of the users or the capabilities of the building, telecommunication providers, or the MSCE.

Further, given the computer-centric and network-centric nature of embodiments and technological, computer and network based improvements provided by embodiments, no claim and no claim limitation is intended to cover any human act or any mental process, consistent with the network centric and computer centric nature of the invention embodiments and operation of same and technological improvements provided by embodiments.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, modifications and variations are possible in view of the above teachings. The embodiments were chosen and described in order to best explain the principles of the invention and its practical applications. They thereby enable others skilled in the art to best utilize the invention and various embodiments with various modifications as are suited to the particular use contemplated.

What is claimed is:

1. A networked computing system, comprising:
   a multi-user network device located in a private cloud computing system in communication with respective end user network devices, wherein respective end user network devices are in communication with respective end user computers of respective tenants of a building and operable to aggregate respective data processing requests from respective end user computing devices of respective tenants, and wherein the multi-user network device is operable to aggregate respective data processing requests received from respective end user network devices for one or more of flow, processing, transmission, and storage; and
   a local shared computing system in the private cloud computing system in proximity to the building and in communication through respective networks with the multi-user network device to the private cloud computing system, the local shared computing system being operable to receive respective data processing requests from the multi-user network device from multiple locations, determine how execution of respective data processing requests should be allocated between the private cloud computing system and the public cloud computing system, and transmit respective results of executing respective data processing requests to the multi-user network device while maintaining data segregation between the respective tenants.

2. The networked computing system of claim 1, wherein end user computing devices of other unrelated tenants are located in the building or in proximity to the building, and the multi-user network device is operable to aggregate respective data processing requests of the unrelated tenants for flow, processing, transmission, and storage of data of the respective users while maintaining data segregation between the respective tenants.

3. The networked computing system of claim 1, wherein respective end user computing devices are also in communication through respective networks with respective internet service provider servers to the local shared computing system in proximity to end users.

4. The networked computing system of claim 1, the multi-user network device being operable to transmit respective results of processing respective data processing requests to respective end user network devices for presentation of respective results to respective tenants through respective displays of respective end user computing devices, wherein respective results are segregated by a respective end user and tenant, but not shared with other end users and tenants, for display through respective end user computers.

5. The networked computing system of claim 1, wherein the local shared computing system is accessed by at least one of the multi-user network device inside of the building, a mobile communication device of an end user located outside of the building, and a computing device with embedded processing both inside and outside of the building.

6. The networked computing system of claim 1, wherein at least one end user network device is located in a first building, at least one end user network device is located in a second building in proximity to the first building, and each of the first building and the second building comprises a multi-user network device.

7. The networked computing system of claim 6, wherein the local shared computing system is located in proximity to each multi-user network device or within a pre-determined distance from each multi-user network device.

8. The networked computing system of claim 1, wherein the local shared computing system is located in proximity to the multi-user network device such that data transmission between the local shared computing system and the multi-user network device is performed using a hop count that is less than a pre-determined maximum hop count.

9. The networked computing system of claim 1, wherein the local shared computing system is located outside of the building and at least some end users are located outside of any single building and in proximity to the building, and wherein network connections between the local shared computing system, the end users, and the private cloud computing system are optimized by reducing or minimizing a hop count to reduce or minimize data communication latency.

10. The networked computing system of claim 1, wherein the multi-user network device is in communication through respective networks with respective servers of respective Internet Service Providers utilized by respective tenants of the building and a network connection comprising an Internet connection is optimized by reducing or minimizing a hop count used to reach the local shared computing system.

11. The networked computing system of claim 1, wherein the multi-user network device is in communication with at least one end user network device of or associated with a first end user computing device of a first tenant located inside of the building and the multi-user network device is in communication with at least one end user network device of or associated with a mobile communication device of a second end user located outside of the building.

12. The networked computing system of claim 1, wherein the multi-user network device is operable to transmit respective data processing requests to the local shared computing system according to a network aggregation rule specifying that the multi-user network device aggregates data processing requests until data processing requests have been received from a pre-determined minimum number of end user computing devices.

13. The networked computing system of claim 1, wherein the multi-user network device is operable to transmit respective data processing requests to the local shared computing system according to a network aggregation rule specifying that the multi-user network device aggregates data processing requests until data processing requests have been received from end user computing devices of respective tenants of a first building and received from a pre-determined number of end user computing devices outside of the first building.

14. The networked computing system of claim 1, wherein the multi-user network device is operable to transmit respective data processing requests to the local shared computing system according to a network aggregation rule specifying that the multi-user network device transmits data processing requests to the local shared computing system after a pre-determined time.

15. The networked computing system of claim 1, wherein the multi-user network devices are operable to transmit respective data processing requests to the local shared computing system according to a network aggregation rule specifying that the multi-user network device transmits data processing requests to the local shared computing system in response to receiving
 at least one data processing request has been received from an end user network device associated with an end user computing device of a tenant in a building, and
 at least one data processing request has been received from an end user network device associated with an end user computing device of an end user computer device located outside of the building.

16. The networked computing system of claim 1, further comprising respective end user network devices of or associated with respective end user computers, which connect to the private cloud computing system.

17. The networked computing system of claim 1, wherein the local shared computing system in the private cloud computing system is operable to execute a data processing request to store information at the local shared computing system, update information stored at the local shared computing system, analyze information stored at the local shared computing system, and execute on data processing requests at the local shared computing system.

18. The networked computing system of claim 1, wherein the local shared computing system is operable to execute a data processing request to execute an application hosted or accessible by the local shared computing system and to execute a data processing request with respect to the data on the hosted or accessible application.

19. The networked computing system of claim 1, wherein the local shared computing system is operable to execute a data processing request to provide one or more Internet services selected by the end user in or outside of the building from the group consisting of Internet access, web hosting, email, webmail, domain name management, storage, compute, colocation services and an e-commerce application.

20. A method for managing a networked computing system including a multi-user network device located in a private cloud computing system in communication with respective end user network devices, wherein respective end user network devices are in communication with respective end user computers of respective tenants of a building and operable to aggregate respective data processing requests from respective end user computing devices of respective tenants, and wherein the multi-user network device is operable to aggregate respective data processing requests received from respective end user network devices, the method comprising:
 providing a local shared computing system in the private cloud computing system in proximity to the building and in communication through respective networks with the multi-user network device and a public cloud computing system;
 receiving, by the local shared computing system, respective data processing requests from the multi-user network device;
 determining, by the local shared computing system, how execution of respective data processing requests should be allocated between private cloud computing system and the public cloud computing system; and
 transmitting, by the local shared computing system, respective results of executing respective data processing requests to the multi-user network device for one or more of flow, processing, transmission, and storage while maintaining data segregation the respective tenants.

* * * * *